US008522415B2

(12) United States Patent
Macey

(10) Patent No.: US 8,522,415 B2
(45) Date of Patent: Sep. 3, 2013

(54) DRAINABLE OIL FILTER SYSTEM AND METHOD FOR DRAINING OIL FROM AN ENGINE

(76) Inventor: George H. Macey, Preston, MD (US)

( * ) Notice: Subject to any disclaimer, the term of this patent is extended or adjusted under 35 U.S.C. 154(b) by 653 days.

(21) Appl. No.: 12/661,650

(22) Filed: Mar. 22, 2010

(65) Prior Publication Data
US 2011/0225786 A1 Sep. 22, 2011

(51) Int. Cl.
B23P 6/00 (2006.01)
F02M 37/22 (2006.01)
F16N 33/00 (2006.01)
F16C 3/14 (2006.01)

(52) U.S. Cl.
USPC ..... 29/402.08; 210/248; 210/440; 123/196 A; 184/1.5; 29/402.03

(58) Field of Classification Search
USPC ............ 29/402.01, 402.03, 402.08; 210/248, 210/234, 440, 446; 123/196 A; 184/1.5
See application file for complete search history.

(56) References Cited

U.S. PATENT DOCUMENTS

| 3,235,085 | A | | 2/1966 | Humbert, Jr. | |
|---|---|---|---|---|---|
| 4,101,000 | A | | 7/1978 | Scully | |
| 4,497,706 | A | | 2/1985 | Pickett et al. | |
| 4,776,431 | A | | 10/1988 | Poling | |
| 4,855,041 | A | * | 8/1989 | Church et al. | 210/120 |
| 4,872,976 | A | | 10/1989 | Cudaback | |
| 5,070,831 | A | * | 12/1991 | Yunick | 123/196 A |
| 5,196,112 | A | * | 3/1993 | Eichman | 210/171 |
| 5,246,086 | A | * | 9/1993 | Yunick | 184/1.5 |
| 5,250,176 | A | | 10/1993 | Daniel | |
| 5,533,554 | A | * | 7/1996 | Young | 141/383 |
| 5,546,979 | A | * | 8/1996 | Clark et al. | 137/318 |
| 5,785,850 | A | * | 7/1998 | Lynch et al. | 210/304 |
| 6,298,947 | B1 | * | 10/2001 | Flynn | 184/1.5 |
| 6,488,845 | B1 | | 12/2002 | Neufeld et al. | |
| 6,655,498 | B1 | * | 12/2003 | Sasa et al. | 184/1.5 |
| 6,902,038 | B2 | * | 6/2005 | Takahara | 184/1.5 |
| 7,008,472 | B2 | * | 3/2006 | Fornof et al. | 96/136 |
| 7,060,184 | B2 | * | 6/2006 | Cline et al. | 210/248 |
| 7,141,166 | B2 | * | 11/2006 | Sugiura et al. | 210/234 |
| 7,150,828 | B2 | * | 12/2006 | Sakata et al. | 210/234 |
| 7,297,282 | B2 | * | 11/2007 | Suzumori et al. | 210/767 |
| 7,507,339 | B2 | * | 3/2009 | Gilles et al. | 210/235 |
| 7,727,390 | B2 | * | 6/2010 | Ruffet et al. | 210/232 |
| 8,020,580 | B2 | * | 9/2011 | Ahuja et al. | 137/317 |
| 8,127,784 | B2 | * | 3/2012 | Cesarz | 137/15.13 |
| 2002/0020660 | A1 | * | 2/2002 | Jainek et al. | 210/435 |
| 2003/0070876 | A1 | * | 4/2003 | Takahara | 184/1.5 |
| 2003/0150787 | A1 | * | 8/2003 | Morita | 210/234 |
| 2004/0144734 | A1 | * | 7/2004 | Suzumori et al. | 210/767 |
| 2005/0054402 | A1 | * | 3/2005 | Noguchi et al. | 463/5 |
| 2005/0077253 | A1 | * | 4/2005 | Sugiura et al. | 210/767 |
| 2006/0096808 | A1 | * | 5/2006 | Rosenbaum | 184/1.5 |

(Continued)

Primary Examiner — Essama Omgba
(74) Attorney, Agent, or Firm — Richard L. Miller

(57) ABSTRACT

A drainable oil filter for an engine of a motor vehicle which comprises a cylindrical canister having a closed first end and a second end adapted to be screwed onto the engine of a motor vehicle. A mechanism on the closed first end of the cylindrical canister is for draining residual oil from the cylindrical canister. After oil in a crankcase of the engine of the motor vehicle is drained and before the second end of the cylindrical canister is unscrewed from the engine of the motor vehicle, the draining mechanism when operated by a person will allow the residual oil in the cylindrical canister to exit safely therefrom into a suitable container, without soiling the person positioned under the draining mechanism.

4 Claims, 2 Drawing Sheets

(56) References Cited

U.S. PATENT DOCUMENTS

| | | |
|---|---|---|
| 2007/0034560 A1* | 2/2007 | Janik et al. .................. 210/248 |
| 2007/0144958 A1* | 6/2007 | Gilles et al. .................. 210/424 |
| 2009/0206022 A1* | 8/2009 | Ogawa et al. .................. 210/248 |
| 2010/0000930 A1* | 1/2010 | Ahuja et al. .................. 210/248 |
| 2011/0100756 A1* | 5/2011 | Peng .................. 184/1.5 |

* cited by examiner

DRAINABLE OIL FILTER SYSTEM AND METHOD FOR DRAINING OIL FROM AN ENGINE

BACKGROUND OF THE INVENTION

1. Field of the Invention

The present invention relates to a oil filter, and more particularly, a drainable oil filter and method for draining oil from an engine.

2. Description of the Prior Art

Numerous innovations for oil filters with valve mechanisms have been provided in the prior art that will be described. Even though these innovations may be suitable for the specific individual purposes to which they address, however, they differ from the present invention.

A FIRST EXAMPLE, U.S. Pat. No. 3,235,085, Issued on Feb. 15, 1966, to Humbert Jr. teaches an oil filter comprising a casing with an inlet and outlet in one end thereof, a filter support member disposed adjacent the one end surrounding the outlet, a filter element supported on the member between the inlet and outlet for filtering oil flowed therebetween, port means in the member for communicating the inlet with the outlet, a slidable valve member extending between and blocking the port means and the outlet, biasing means maintaining the valve member seated over the inlet when oil ceases to flow through the inlet, the valve member having an area disposed to permit the pressure of oil entering the inlet to unseat it a sufficient distance from the inlet to permit normal filtering of oil, and the valve being disposed to permit a substantially higher oil pressure to act against a reduced portion of the area when the filter is clogged to unseat the valve a further distance from the inlet to open the port means to permit oil to bypass the filter element.

A SECOND EXAMPLE, U.S. Pat. No. 4,101,000, Issued on Jul. 18, 1978, to Scully teaches a mechanism for draining an engine oil filter cartridge when the space beneath the cartridge is otherwise obstructed. A special housing is threadably connected to the filter base in a non-obstructed location. A drain plug within this housing is manually unthreaded during a drain operation. A special boot in the mouth opening of the housing permits external actuation of the plug without undesired splash-out of oil through the mouth opening.

A THIRD EXAMPLE, U.S. Pat. No. 4,497,706, Issued on Feb. 5, 1985, to Pickett et al. teaches an oil filter relief valve having a tension spring housing with oil inlets and a first end and a second end, the first end being located adjacent the mounting plate of the filter, a base being fixedly connected to the second end of the spring housing and tension abutting and extending into the center tube of the filter element, a valve seat having a pointed surface and being located in the base with a channel formed therein for conducting oil therethrough, a resilient piston normally abutting the valve seat in sealing relation, a relatively rigid piston support on the piston, and a tension spring positioned between the first end of the tension spring housing and the piston support to urge the piston into sealing relation against the valve seat. This relief valve opens when the pressure of the oil entering the oil inlets and the channel in the valve seat exceed a particular threshold amount, thus exerting a force on the piston greater than the downward force naturally exerted by the spring. The piston is then lifted from the valve seat and the oil is allowed to flow through the relief valve and by-pass the filter element to immediately re-enter the motor.

A FOURTH EXAMPLE, U.S. Pat. No. 4,776,431, Issued on Oct. 11, 1988, to Poling teaches a method and apparatus for changing oil in an internal combustion engine that pierces an outer wall of an old oil filter containing old motor oil to form an opening in a lower portion of the filter wall. Old motor oil is drawn from the pierced oil filter into a container by suction through the filter wall opening and a suction conduit. The oil drain plug from a crankcase containing old motor oil is removed to form a drain opening in the crankcase, and old motor oil is drawn from the crankcase into a container by suction through the drain opening and a suction cup, to empty the crankcase of old motor oil. The drain opening is closed after emptying the crankcase of old motor oil by securing the drain plug in the drain opening. The pierced and drained old oil filter is replaced with a new filter and the drained crankcase is refilled with fresh motor oil.

A FIFTH EXAMPLE, U.S. Pat. No. 4,872,976, Issued on Oct. 10, 1989, to Cudaback teaches an elastomeric valve member which coacts with a valve seat and an apertured plate to control the flow of oil between the inlet and outlet of an oil filter for an internal combustion engine. When the engine is shut down, the valve member seals against both the valve seat and the plate to hold oil in the filter and prevent such oil from returning to the crankcase via the inlet. Under normal running conditions, the valve member unseals with respect to the plate to permit oil to flow between the inlet and outlet by way of the filter element of the filter. If the pressure differential between the inlet and the outlet exceeds a predetermined value, the valve member unseals with respect to the valve seat to enable the oil to bypass the filter element and to flow directly from the inlet to the outlet.

A SIXTH EXAMPLE, U.S. Pat. No. 5,250,176, Issued on Oct. 5, 1993, to Daniel teaches a modular compound valve assembly for an automotive oil filter that includes a relief valve subassembly and a clean-side anti-drainback valve subassembly sharing a common unitary valve body. In one preferred form, the valves body is formed of a stepped cylinder, wherein axially opposed surfaces of a first step comprise respective seats for first and second springs utilized in the two valve subassemblies. The first spring (for the relief valve) is entirely contained within the valve body, while the second spring (for the anti-drainback valve) is external to the valve body although supported thereon. The second spring is a frustoconically-shaped spring biased between the first step of the valve body and an external circular disc spaced from but fixed to a plunger of the anti-drainback valve. To the extent that the anti-drainback plunger is adapted for being seated within the valve body, the compound valve assembly offers greater flexibility in stocking inventories of valve subassemblies for in-field selection and modification. For example, the anti-drainback valve subassembly may be "piggybacked" onto the relief valve subassembly without requirement of special tools. Finally, in the same preferred form, the anti-drainback subassembly includes a pair of struts fixed to the circular disc, wherein the second spring is maintained under constant compression between the disc and step of the valve body to close the anti-drainback plunger, and hence to avoid leakage of clean oil from the filter, upon shutdown of an associated engine.

A SEVENTH EXAMPLE, U.S. Pat. No. 6,488,845, Issued on Dec. 3, 2002, to Neufeld et al. teaches an oil filter assembly which includes a filter housing and a release valve for regulating oil drainage from a filter chamber in the filter housing. A filter module is arranged in the filter chamber to engage the release valve. A first biasing element normally moves the release valve to an opened position allowing drainage of oil from the filter chamber to urge the filter module to cause the release valve to move against and overcome a biasing force generated by the first biasing element to the closed position when the filter module is installed in a oil-filtering position in the filter housing.

It is apparent now that numerous innovations for oil filters with valve mechanisms have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a drainable oil filter that avoids the disadvantages of the prior art.

ANOTHER OBJECT of the present invention is to provide a drainable oil filter that is simple and inexpensive to manufacture.

STILL ANOTHER OBJECT of the present invention is to provide a drainable oil filter that is simple to use.

BRIEFLY STATED, STILL YET ANOTHER OBJECT of the present invention is to provide a drainable oil filter for an engine of a motor vehicle which comprises a cylindrical canister having a closed first end and a second end adapted to be screwed onto the engine of a motor vehicle. A mechanism on the closed first end of the cylindrical canister is for draining residual oil from the cylindrical canister. After oil in a crankcase of the engine of the motor vehicle is drained and before the second end of the cylindrical canister is unscrewed from the engine of the motor vehicle, the draining mechanism when operated by a person will allow the residual oil in the cylindrical canister to exit safely therefrom into a suitable container, without soiling the person positioned under the draining mechanism.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Figure 1:
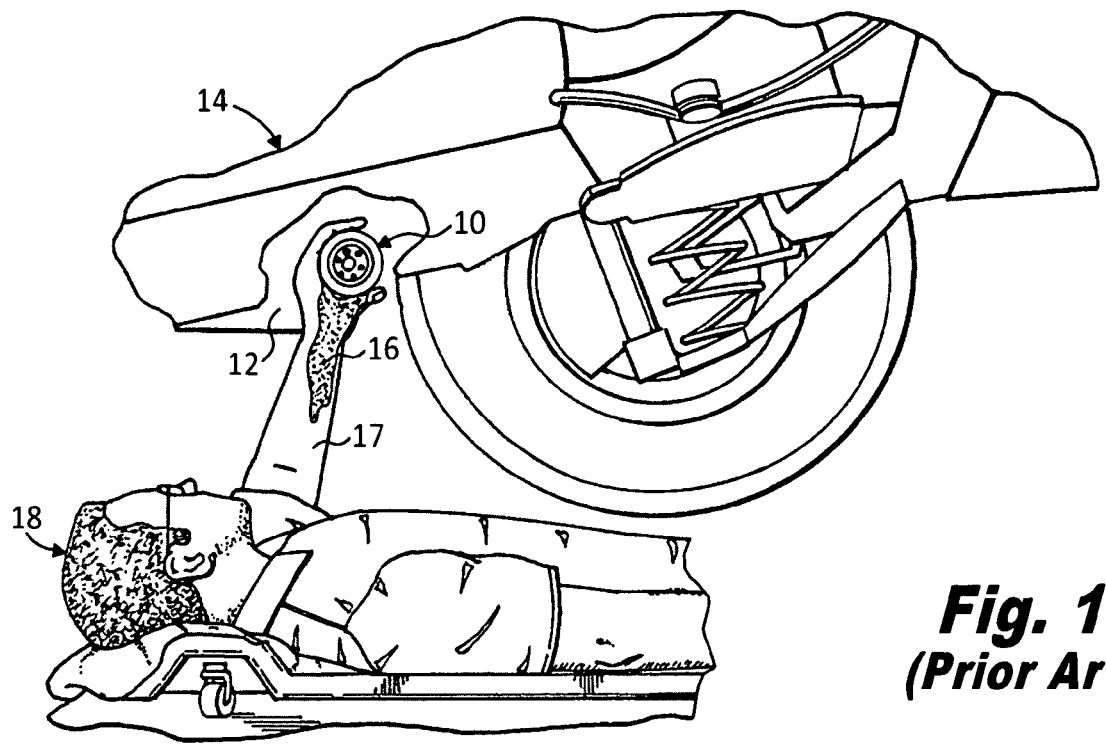
FIG. 1 is a diagrammatic perspective view, with parts broken away, showing a prior art oil filter being removed from an engine of a motor vehicle with oil soiling an arm of a person.

10 prior art oil filter
12 engine of motor vehicle 14
14 motor vehicle
16 residual oil
17 arm of person 18
18 person
20 drainable oil filter
22 cylindrical canister of drainable oil filter 20
24 closed first end of cylindrical canister 22
26 second end of cylindrical canister 22
28 draining mechanism of drainable oil filter 20
30 container
32 petcock for draining mechanism 28
34 drain plug for draining mechanism 28
36 hexagon slotted head of drain plug 34
38 threaded shank of drain plug 34
40 aperture in closed first end 24
42 drain plug for draining mechanism 28
44 reduced square head of drain plug 42
46 threaded shank of drain plug 42

DETAILED DESCRIPTION OF THE PREFERRED EMBODIMENT

Referring now to FIG. 1, in which like numerals indicate like parts, it is a diagrammatic perspective view, with parts broken away, showing a prior art oil filter being removed from an engine of a motor vehicle with oil soiling an arm of a person, and as such, will be discussed with reference thereto.

FIG. 1 shows a prior art oil filter 10 for an engine 12 of a motor vehicle 14 being unscrewed from the engine 12 of the motor vehicle 14. Residual oil 16 in the prior art oil filter 10 will soil an arm 17 of a person 18 positioned under the prior art oil filter 12. This is not desirable.

Figure 2:
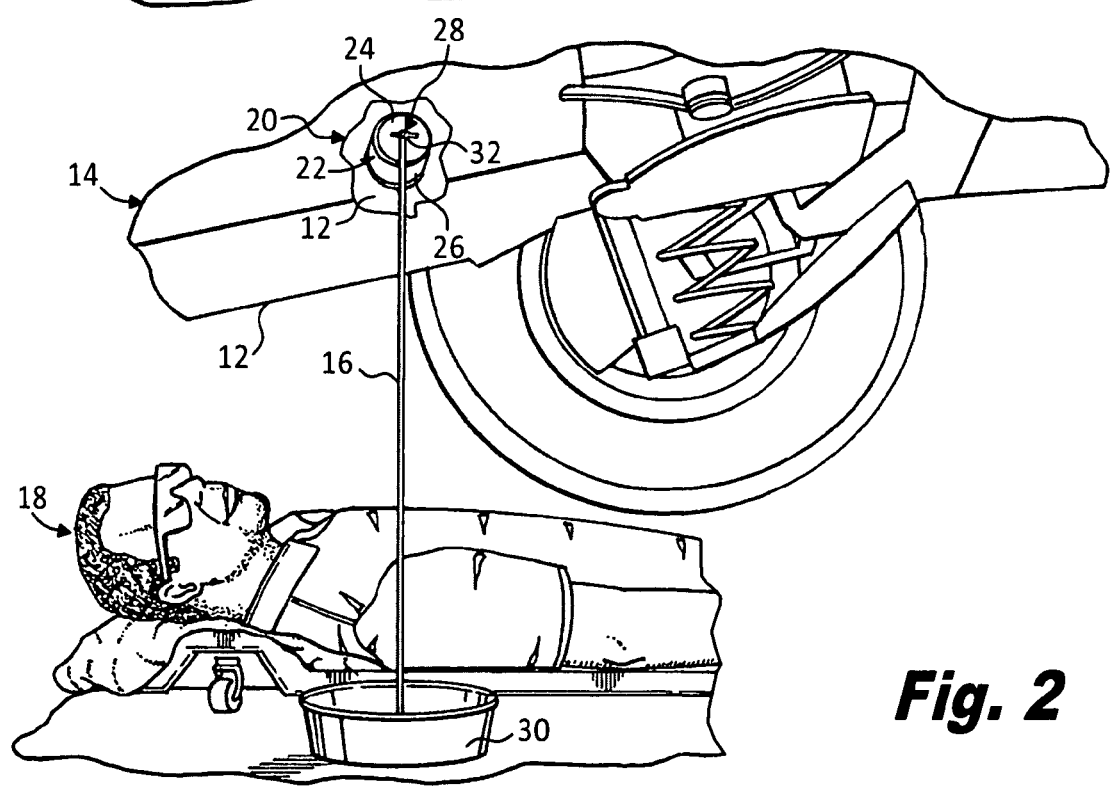
FIG. 2 is a diagrammatic perspective view, with parts broken away, showing an embodiment of the present invention on the engine of the motor vehicle draining residual oil safely therefrom into a suitable container without soiling the person.
Figure 3:
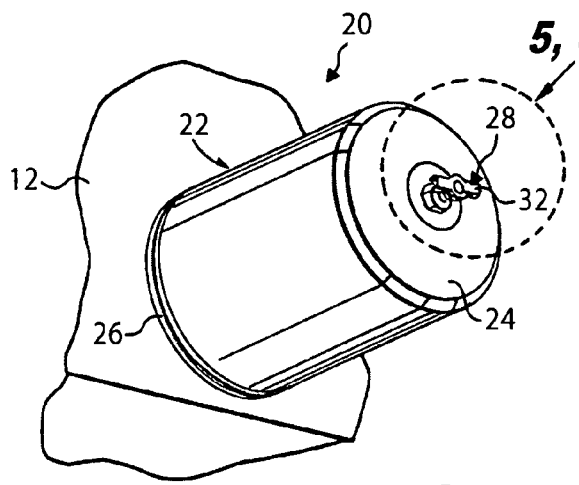
FIG. 3 is a diagrammatic perspective view, showing a first embodiment of the present invention positioned horizontally on the engine.
Figure 5:
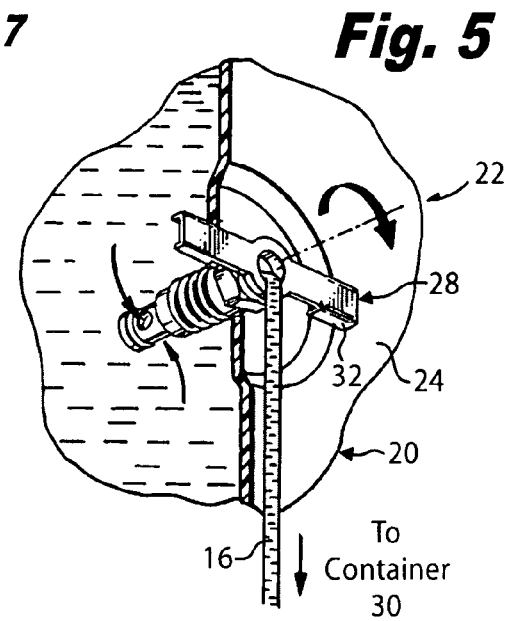
FIG. 5 is an enlarged diagrammatic perspective view, with parts broken away, of the area enclosed in the dotted circle indicated by arrow 5 in FIG. 3, showing the residual oil being drained therefrom.
Figure 4:
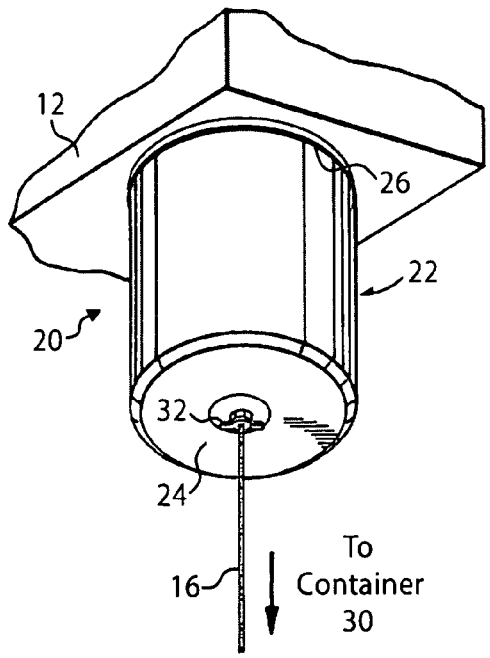
FIG. 4 is a diagrammatic perspective view, showing the first embodiment of the present invention positioned vertically on the engine with the residual oil being drained therefrom.

Referring now to FIGS. 2 through 7, in which like numerals indicate like parts, they are a diagrammatic perspective view, with parts broken away, showing an embodiment of the present invention on the engine of the motor vehicle draining residual oil safely therefrom into a suitable container without soiling the person; a diagrammatic perspective view, showing a first embodiment of the present invention positioned horizontally on the engine; a diagrammatic perspective view, showing the first embodiment of the present invention positioned vertically on the engine with the residual oil being drained therefrom; an enlarged diagrammatic perspective view, with parts broken away, of the area enclosed in the dotted circle indicated by arrow 5 in FIG. 3, showing the residual oil being drained therefrom; an enlarged diagrammatic exploded perspective view, with parts broken away, of the area enclosed in the dotted circle indicated by arrow 6 in FIG. 3, of a second embodiment of the present invention, showing the residual oil being drained therefrom; and an enlarged diagrammatic exploded perspective view, with parts broken away, of the area enclosed in the dotted circle indicated by arrow 7 in FIG. 3, of a third embodiment of the present invention, showing the residual oil being drained therefrom, and as such, will be discussed with reference thereto.

The present invention is a drainable oil filter 20 for the engine 12 of the motor vehicle 14 which comprises a cylindrical canister 22 having a closed first end 24 and a second end 26 adapted to be screwed onto the engine 12 of the motor vehicle 14. A mechanism 28 on the closed first end 24 of the cylindrical canister 22 is for draining residual oil 16 from the cylindrical canister 22. After oil in a crankcase of the engine 12 of the motor vehicle 14 is drained and before the second end 26 of the cylindrical canister 22 is unscrewed from the engine 12 of the motor vehicle 14, the draining mechanism 28 when operated by the person 18 will allow the residual oil 16 in the cylindrical canister 22 to exit safely therefrom into a suitable container 30, without soiling the person 18 positioned under the draining mechanism 28.

The cylindrical canister 22 of the drainable oil filter 20 can be positioned horizontally on the engine 12 of the motor vehicle 14 (See FIGS. 2 and 3). The cylindrical canister 22 of the drainable oil filter 20 can also be positioned vertically on the engine 12 of the motor vehicle 14, so that the closed first end 24 is facing downwardly (See FIG. 4).

Figure 6:
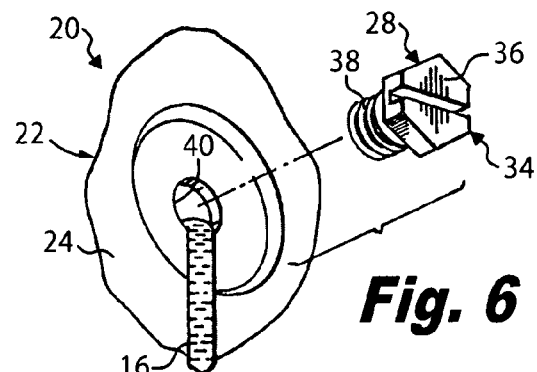
FIG. 6 is an enlarged diagrammatic exploded perspective view, with parts broken away, of the area enclosed in the dotted circle indicated by arrow 6 in FIG. 3, of a second embodiment of the present invention, showing the residual oil being drained therefrom.
Figure 7:
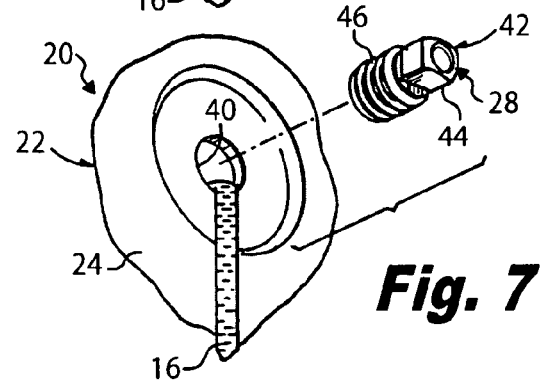
FIG. 7 is an enlarged diagrammatic exploded perspective view, with parts broken away, of the area enclosed in the dotted circle indicated by arrow 7 in FIG. 3, of a third embodiment of the present invention, showing the residual oil being drained therefrom.

The draining mechanism 28, as shown in FIGS. 2 through 5, comprises a petcock 32 in the closed first end 24 of the cylindrical canister 22. The draining mechanism 28, as shown in FIG. 6, comprises a drain plug 34 having a hexagon slotted head 36 and a threaded shank 38 that removably engages with an aperture 40 in the closed first end 24 of the cylindrical canister 22. The draining mechanism 28, as shown in FIG. 7, comprises a drain plug 42 having a reduced square head 44 and a threaded shank 46 that removably engages with the aperture 40 in the closed first end 24 of the cylindrical canister 22.

To use the drainable oil filter 20 for the engine 12 of the motor vehicle 12 the following steps are taken.

1. Provide the cylindrical canister 22 having the closed first end 24, the second end 26 and the drainage mechanism 28 on the closed first end 24 of the cylindrical canister 22, to allow residual oil 16 from the cylindrical canister 22 to exit therefrom.

2. Screw the second end 26 of the cylindrical canister 22 onto the engine 12 of the motor vehicle 14.

3. Operate the draining mechanism 28 by the person 18 after oil in a crankcase of the engine 12 of the motor vehicle 14 is drained and before the second end 26 of the cylindrical canister 22 is unscrewed from the engine 12 of the motor vehicle 14, to allow the residual oil 16 in the cylindrical canister 22 to exit safely therefrom into the suitable container 30, without soiling the person 18 positioned under the draining mechanism 28.

It will be understood that each of the elements described above, or two or more together, may also find a useful application in other types of constructions differing from the types described above.

While the invention has been illustrated and described as embodiments of a drainable oil filter, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A drainable oil filter system for an engine of a motor vehicle which comprises:
    a) a cylindrical canister having a closed first end and a second end for screwing onto the engine of the motor vehicle; and
    b) means for draining the oil from said cylindrical canisters;
    wherein said means comprises a petcock extending axially in said closed first end of said cylindrical canister;
    wherein said petcock of said means has feed bores;
    wherein said feed bores in said petcock of said means are disposed within said cylindrical canister for feeding the oil through said petcock; and
    wherein said feed bores in said petcock of said means are laterally, and not axially, oriented.

2. The drainable oil filter system as recited in claim 1, wherein said draining means comprises a drain plug having a hexagon slotted head and a threaded shank that removably engages with an aperture in said closed first end of said cylindrical canister.

3. The drainable oil filter system as recited in claim 1, wherein said draining means comprises a drain plug having a reduced square head and a threaded shank that removably engages with an aperture in said closed first end of said cylindrical canister.

4. A method of using a drainable oil filter system for fitting on an engine of a motor vehicle comprising the steps of:
    a) providing a cylindrical canister having a second end for screwing onto the engine of the motor vehicle, and a closed first end having a draining means thereon;
    b) before filling the engine with oil, screwing the second end of the cylindrical canister onto the engine of the motor vehicle; and
    c) when an engine oil change is to be performed, operating the draining means by a person before the second end of the cylindrical canister is unscrewed from the engine of the motor vehicle to allow the oil to exit safely therefrom into a suitable container, without soiling the person positioned under the draining means;
    wherein the draining means comprises a petcock in the closed first end of the cylindrical canister;
    wherein the petcock of the draining means has feed bores;
    wherein the feed bores in the petcock of the draining means are disposed within the cylindrical canister for feeding the oil through the petcock; and
    wherein the feed bores in the petcock of the draining means are laterally, and not axially, oriented.

* * * * *